NEGATIVE RESISTANCE DEVICE MODULATOR

Filed Dec. 17, 1959 2 Sheets-Sheet 1

INVENTOR
G. C. DACEY
BY
Arthur J. Torsiglieri
ATTORNEY

NEGATIVE RESISTANCE DEVICE MODULATOR

Filed Dec. 17, 1959 2 Sheets-Sheet 2

INVENTOR
G.C. DACEY
BY
Arthur J. Torsiglieri
ATTORNEY

United States Patent Office 3,090,014

Patented May 14, 1963

3,090,014

NEGATIVE RESISTANCE DEVICE MODULATOR

George C. Dacey, Murray Hill, N.J., assignor to Bell Telephone Laboratories, Incorporated, New York, N.Y., a corporation of New York Filed Dec. 17, 1959, Ser. No. 860,183
10 Claims. (Cl. 332—52)

This invention relates to semiconductive devices and more particularly to such devices providing a negative resistance characteristic.

There is considerable current interest in a device now usually described as a tunnel diode. The basic principles of a tunnel diode are described in an article entitled "Tunnel Diode—New Electronic Workhouse" appearing in the August 1959 issue of Electronics Industries. Such a diode derives its name from the fact that it comprises a semiconductive wafer including a narrow p-n junction between two degenerate zones such that for appropriate values of forward bias quantum-mechanical tunneling through the junction results in a negative resistance characteristic between connections to the two zones. Stated somewhat differently, such a diode is characterized by the fact that the Fermi level is above the bottom of the conduction band on the n-type side of the junction and below the top of the valence band on the p-type side of the junction.

One limitation on the usefulness of such a device is that it is a two terminal device which makes it awkward to isolate an input branch from an output branch when such a device is included in a circuit arrangement.

Another limitation on the usefulness of such a device is that it is difficult to modulate the negative resistance.

The present invention is directed at a device which overcomes one or more of these limitations.

A feature of the present invention is a semiconductive wafer including a p-n junction separating a degenerate zone from a nearly degenerate zone, advantageously the former being p-type and the latter n-type, in combination with means for establishing in the n-type zone a "hot" electron distribution whereby the "imref" in such zone is above the bottom of the conduction band. (The terms in quotations are defined below.) Moreover, modulation of the depth of penetration into the conduction band of the imref level is used to modulate the tunneling current and thereby the negative resistance.

Various embodiments in accordance with the invention can be devised. In the preferred embodiment, two electrodes are connected to the nearly degenerate n-type zone by means of which a large electric field is established therein transverse to the junction for providing energy to the electrons. By providing a field sufficiently high that the electrons gain energy from the field faster than they lose it to the lattice, they become hot in the sense that if a temperature is used to describe their average energy, that temperature will be higher than the ambient temperature of the lattice. This is discussed more fully in a paper entitled "Mobility of Holes and Electrons in High Electric Fields," by E. J. Ryder in the Physical Review, volume 90, pages 766–769. In such an instance since the n-type material is now no longer in equilibrium it is no longer appropriate to speak of a Fermi level, but it is conventional to describe the analogous level in the non-equilibrium material as the imref level.

In another embodiment the desired hot electron distribution is achieved by positioning the wafer in a magnetic field and applying to it energy of the radio frequency of the cyclotron resonance corresponding to the magnetic field whereby the electrons are heated by absorbing energy from the radio frequency field.

In another embodiment the hot electron distribution is achieved by locating the active junction across which tunneling is to occur in close proximity with a second junction which is biased in reverse beyond avalanche breakdown whereby hot electrons from the avalanching junction are able to reach the active junction.

The invention will be better understood from the following more detailed description, taken in conjunction with the accompanying drawing, in which.

Figure 1:
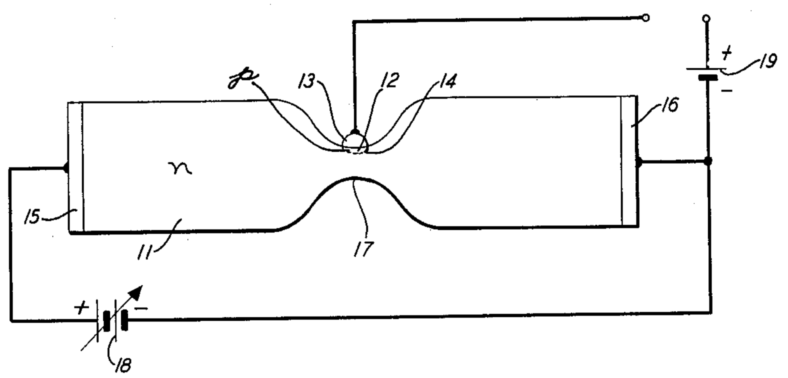
FIG. 1 illustrates the preferred embodiment in which a transverse electric field is used to establish a hot electron distribution.

With reference now more specifically to the drawing, the semiconductive device 10 includes a semiconductive wafer, typically monocrystalline silicon, whose bulk portion 11 is n-type but which includes a p-type regrowth layer 12 formed by alloying an acceptor-rich electrode 13 thereto. The n-type zone is not quite degenerate, the donor concentration being less than $10^{19}$ per cubic centimeter and typically about $10^{18}$ per cubic centimeter. The p-type zone 12 is degenerate, the acceptor concentration being in excess of $10^{19}$ per cubic centimeter and typically about $10^{20}$ per cubic centimeter. The p-type zone is formed in a manner to result in a narrow p-n junction 14 in the manner usual to the fabrication of tunnel diodes. Electrodes 15 and 16 are connected to opposite ends of the n-type zone. The p-n junction is located intermediate between such electrodes in a region 17 of greatly reduced cross section, typically of area ten percent of the area of the bulk of the wafer of the n-type zone. A voltage source 18 is connected between electrodes 15 and 16 to establish an electric field in the n-type zone. Because most of the applied voltage drops along the region of reduced cross section, the electric field is high in this region. The applied voltage should be of sufficient magnitude to provide an electric field in excess of $10^4$ volts per cubic centimeter in this region. Since, in this region the electric field will be parallel to one dimension of the p-n junction, it is important to keep small, typically no more than $10^{-2}$ mils, the dimension of the junction parallel to the direction of the electric field to minimize the voltage drop along the junction. The other dimension of the junction (normal to the plane of the drawing) is not limited by this consideration and may advantageously be long to form a strip junction so long as the total capacitance of the junction is not made excessively high. Between electrodes 13 and 16 a voltage source 19 is connected poled to provide a forward bias on the p-n junction. Additionally, in conventional oscillator operation there would be inserted between electrodes 13 and 19 a load and other reactive elements to form a tuned circuit.

Figure 4:
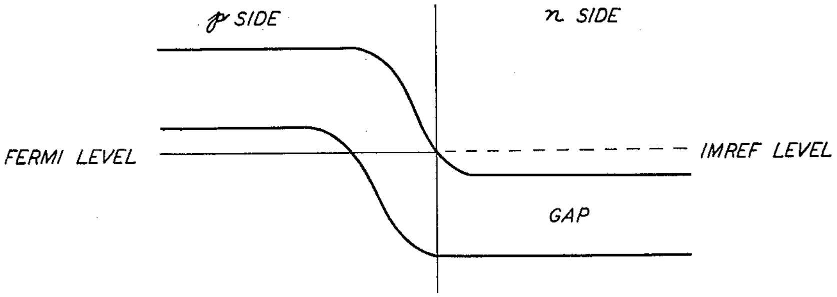
FIG. 4 is the energy band picture applicable to each of the various embodiments.

In operation, the magnitude of the voltage provided by source 18 is adjusted to provide hot electrons in the portion of the n-type zone underlying the p-n junction such that the band picture is as shown in FIG. 4.

As shown in this figure, it can be seen that on the n-type side of the junction, the imref is above the bottom of the conduction band. In nondegenerate material, the Fermi level is normally in the energy gap and so below the bottom of the conduction band. On the degenerate p-type side, the Fermi level is below the top of the valence band in normal fashion.

By reference to the band picture, it can be seen that it is possible to obtain a tunneling current across the junction for either direction of applied bias. For reverse bias there results the typical low impedance slope characteristic of a Zener current. For forward bias one obtains the typical tunnel diode characteristic which is displaced in the present instance in the negative voltage direction by the reverse floating potential acquired by the junction because of the hot electron distribution. The junction will acquire a reverse floating potential under open circuit conditions because of the necessity of the electrostatic potential to increase sufficiently to counterbalance the increased tendency of the hot electrons to cross the junction.

Figure 5:
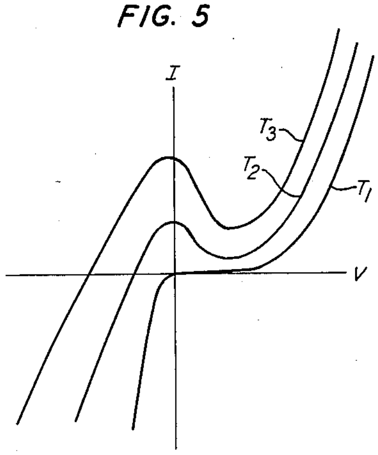
FIG. 5 illustrates the variation in voltage-current characteristics with different electron energy distributions of the embodiments shown.

The voltage-current characteristic resulting is shown in FIG. 5 where the current I, flowing in the circuit between electrodes 13 and 16, is plotted against V, the voltage measured between electrodes 13 and 16, for different values of the hot electron distribution temperature T, which is directly related to the voltage provided by the source 18. Higher values of T are denoted by higher subscripts. As can be seen, the higher the temperature T, the smaller (i.e. better) the magnitude of the negative resistance.

From the foregoing, it can be appreciated that modulation of the voltage source 18 provides modulation of the effective negative resistance available between electrodes 13 and 16. To indicate that the voltage applied between electrodes 15 and 16 can be varied, the voltage source 18 is shown as variable. Typically, modulating information would be used to vary the voltage applied between electrodes 15 and 16 and achieve a corresponding modulation in the current flowing between electrodes 13 and 16.

Figure 2:
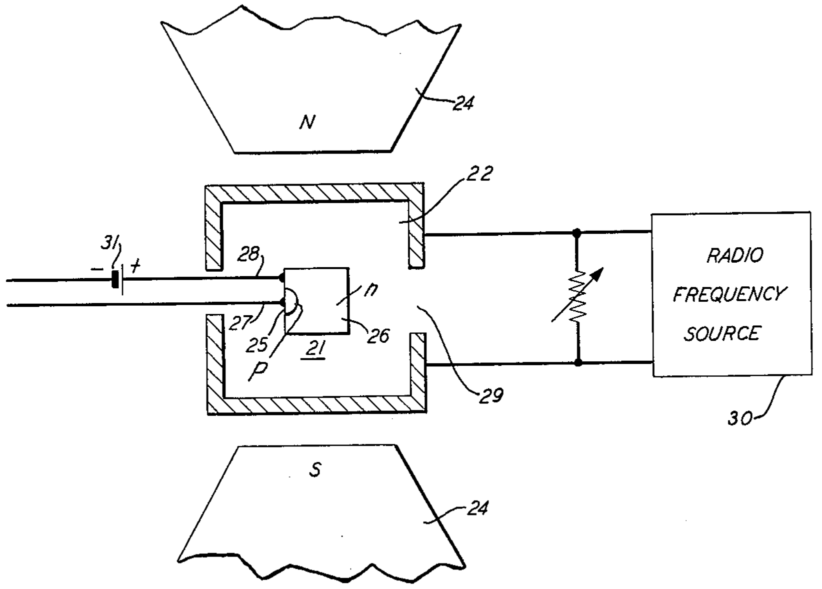
FIG. 2 illustrates an embodiment in which cyclotron resonance is employed to establish a hot electron distribution.

FIG. 2 shows an arrangement in which the hot electron distribution is achieved by exciting the electrons to cyclotron resonance. In this arrangement, a semiconductive diode 21 is housed in a cavity 22 supported in a region where the electric field is strong (by means not shown) and immersed in a steady magnetic field established between the pole faces of magnet 24.

The diode 21 includes a semiconductive wafer which is made up of p-type zone 25 and n-type zone 26 and electrodes 27 and 28 connected to the respective zones. The doping level in zone 26 is adjusted so that the zone is not quite degenerate while the doping level of zone 25 is chosen to make the zone degenerate. The magnitude of the applied magnetic field is chosen so that the cyclotron resonance frequency of the free electrons in zone 25 correspond to the resonant frequency of the cavity. As is well known, the electron resonance frequency is given by $$\frac{eB}{m}$$

where $e$ is the charge of the electron, $m$ is its effective mass, and B is the magnitude of the applied magnetic field. Additionally, radio frequency energy of the cyclotron resonance frequency is supplied to the cavity by way of the iris 29 from the radio frequency source 30. In this arrangement, the electrons are heated by absorbing energy from the radio frequency field. When the electrons are heated sufficiently that their imref level is above the bottom of the conduction band, the condition shown in FIG. 4 obtains, and quantum-mechanical tunnelling results.

For operation as a tunnel diode, diode 21 is operated with an appropriate forward bias on its p-n junction by connecting voltage source 31 between electrodes 27 and 28. In this arrangement modulation of the negative resistance available between electrodes 27 and 28 is achieved by modulating the amount of radio frequency energy supplied to the cavity.

Figure 3:
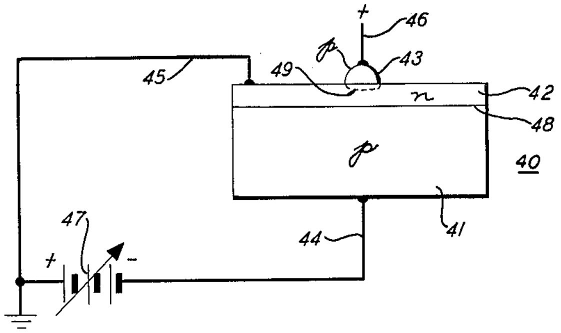
FIG. 3 illustrates an embodiment in which proximity to an avalanching junction is used to establish a hot electron distribution.

FIG. 3 shows another structure for achieving a hot electron distribution in an n-type zone. A semiconductive wafer 40 is provided which includes a p-type bulk portion 41 contiguous with a thin n-type surface layer zone 42 and a discrete p-type zone 43 contiguous with a surface portion of the zone 42. Electrodes 44, 45 and 46 make low resistance connections to the respective zones. Zone 41 is made of relatively high resistivity, zone 42 nearly degenerate and zone 43 degenerate. A voltage source 47 is connected between electrodes 44 and 45 to reverse bias p-n junction 48 which separates zones 41 and 42. The magnitude of the applied bias is adjusted to cause avalanching of the junction 48 whereby hot electrons are created in the zone 42. The thickness of zone 42 at least in the region where it forms p-n junction 49 with zone 43 is made no more than a few mean free paths of hot avalanching electrons whereby such electrons can effectively tunnel through the junction 48. It may be advantageous actually to limit avalanching to the portion of junction 48 which is opposite junction 49. This can be achieved most readily by making zone 41 of lower resistivity at such desired portion along junction 48 than along the remainder of the junction.

The energy picture of the region associated with junction 49 is as shown in FIG. 4. Accordingly, by maintaining an appropriate forward bias on junction 49 by connecting a voltage source between electrodes 45 and 46, a negative resistance results between such electrodes. In this instance modulation of the negative resistance is possible by modulation of the voltage applied between electrodes 44 and 45.

It can be seen that there are a variety of ways for instrumenting the basic concept of the invention. In particular, it has been shown that a variety of techniques are feasible for creating hot electrons in a nearly degenerate n-type contiguous with a degenerate p-type zone for giving rise to quantum-mechanical tunneling through the zone. Moreover, the invention has analogous embodiments utilizing hot holes created in a nearly degenerate p-type zone contiguous with a degenerate n-type zone for giving rise to quantum-mechanical tunneling through the zone. However, because of their lighter effective mass and higher mobilities, it is preferable to excite the electrons to a heated state.

It can also be appreciated that the principles of the invention are not dependent on a particular kind of semiconductor. Other semiconductors, such as germanium, germanium-silicon alloys and compound semiconductors, can be adapted for use with the invention.

What is claimed is:

1. In combination, a semiconductive wafer including two zones of opposite conductivity type defining therebetween a p-n junction sufficiently narrow for quantum-mechanical tunneling therethrough, one of said zones being degenerate and the other being nearly degenerate, means for establishing in said nearly degenerate zone hot charge carriers whereby quantum-mechanical tunneling occurs through said junction, and means for biasing said junction in the forward direction to a point where a negative resistance results across said junction as a result of said tunneling.

2. The combination of claim 1 further characterized in that the means for creating the hot charge carriers in the nearly degenerate zone comprises means for establishing in said zone an electric field parallel to the junction.

3. A modulation arrangement including the combination of claim 2 in combination with means for varying the strength of said electric field in accordance with modulating intelligence.

4. The combination of claim 1 further characterized in that the means for creating the hot charge carriers in the nearly degenerate zone comprises a cavity in which the wafer is located, means for applying a steady magnetic field to the cavity for creating cyclotron resonance of the charge carriers at the resonant frequency of the cavity, and means for supplying energy of said resonant frequency to the cavity.

5. A modulation arrangement including the combination of claim 4 in combination with means for varying the amount of energy of the resonant frequency supplied to the cavity.

6. The combination of claim 1 further characterized in that the means for creating the hot charge carriers in the nearly degenerate zone comprises a second zone of the conductivity type of the degenerate zone and contiguous with the nearly degenerate zone for forming a second p-n junction separated from the first-mentioned p-n junction by a distance no greater than several mean paths of the charge carriers and means for biasing said second junction in reverse beyond the onset of avalance breakdown.

7. A modulation arrangement including the combination of claim 6 in combination with means for varying the bias on said second junction in accordance with modulating intelligence.

8. A semiconductive device comprising a semiconductive wafer including a first extended zone of one conductivity type which is nearly degenerate and includes a discrete region of greatly restricted cross section between two opposite ends and a second zone of the opposite conductivity type contiguous with the first zone only along the discrete region of greatly restricted cross section for forming a junction sufficiently narrow for quantum-mechanical tunneling to occur, first and second electrodes connected to said first zone on opposite sides of said discrete region, and a third electrode connected to the second zone.

9. The device of claim 8 in combination with voltage supply means connected between said first and second electrodes for creating hot charge carriers in the discrete region of said first zone and voltage supply means connected between said first and third electrodes for biasing the junction between said first and second zones in the forward direction for establishing a negative resistance between said first and third electrodes.

10. In combination, a semiconductive device comprising a semiconductive wafer including a first zone of one conductivity type, a nearly degenerate second zone of the opposite conductivity type contiguous with said first zone for forming a first p-n junction, and a degenerate third zone of said one conductivity type contiguous with said second zone for forming a second p-n junction, said second junction being sufficiently narrow for quantum-mechanical tunneling to occur, the first and second zones being opposite one another and spaced apart a distance which is less than several mean free paths of the charge carriers predominant in the second zone, and separate electrodes connected to the three separate zones, and voltage supply means connected between the electrodes to the first and second zones for biasing the first junction in reverse beyond the onset of avalanche breakdown, and voltage supply means connected between said second and third zones for biasing the second junction in the forward direction to the point of negative resistance.

References Cited in the file of this patent

UNITED STATES PATENTS

| | | |
|---|---|---|
| 2,769,926 | Lesk | Nov. 6, 1956 |
| 2,907,934 | Engel | Oct. 6, 1959 |
| 2,928,950 | Myer | Mar. 15, 1960 |
| 3,006,791 | Webster | Oct. 31, 1961 |
| 3,018,423 | Aarons et al. | Jan. 23, 1962 |

OTHER REFERENCES

Pub. I: New Phenomenon in Narrow Germanium p-n Junctions by Esaki, Physical Review, vol. 109, 1958, pages 603, 604.

Pub. II: Tunnel Diodes as High-Frequency Devices by Sommers, Proceedings of the IRE, July 1959, pages 1201 to 1206.